United States Patent Office 3,510,099
Patented May 5, 1970

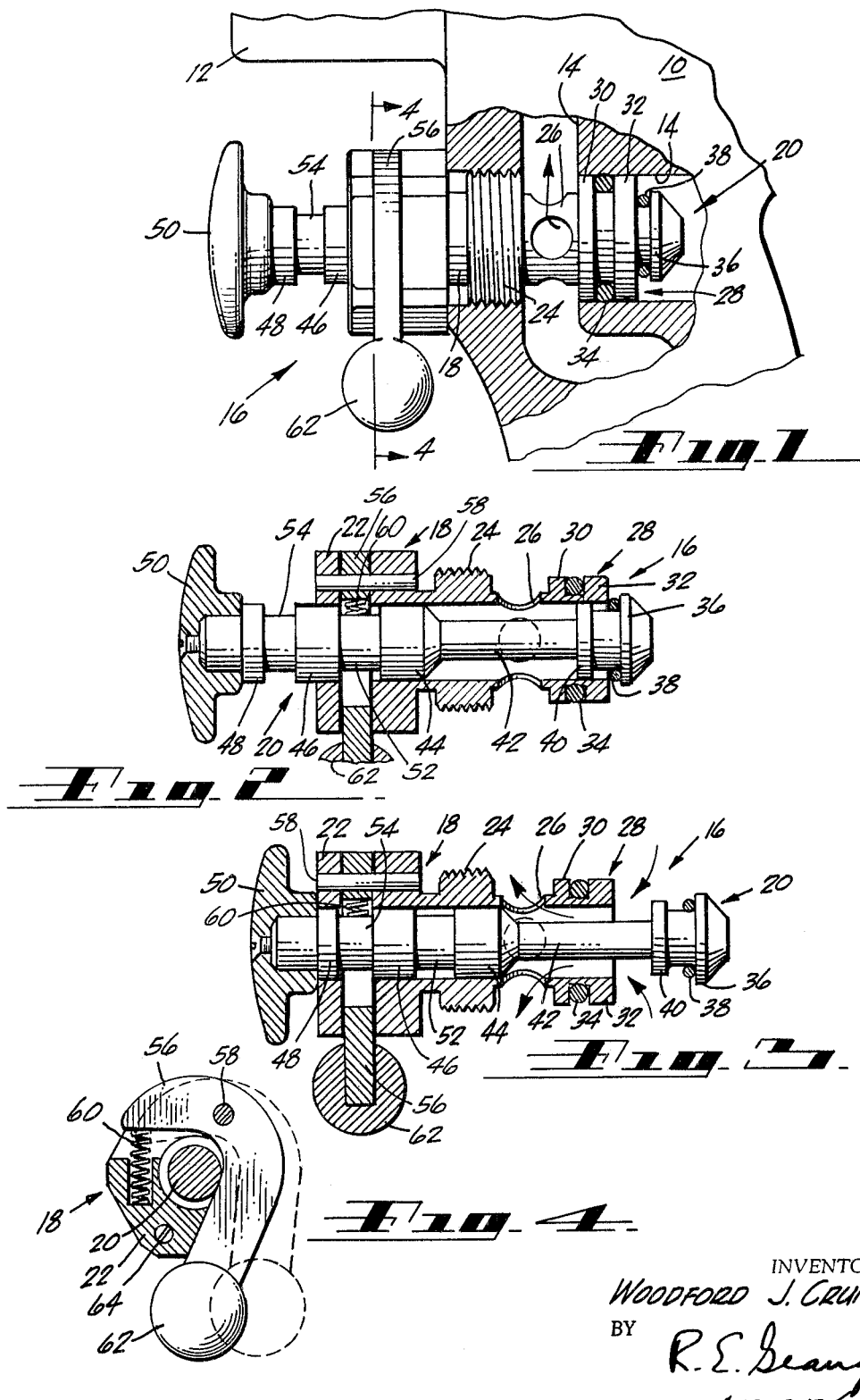

---

3,510,099
TWO POSITION SAFETY VALVE FOR AIR DRIVEN MOTORS
Woodford J. Crump, South Gate, Calif., assignor to Monogram Industries, Inc., Los Angeles, Calif., a corporation of California
Filed July 17, 1968, Ser. No. 745,511
Int. Cl. F16k *35/06*
U.S. Cl. 251—116     5 Claims

ABSTRACT OF THE DISCLOSURE

A novel valve assembly for controlling the supply of air to a pneumatically operated motor wherein a ratcheting pawl is provided to lock the valve in either the open or closed position, the pawl being normally biased to the locking position and the pawl including structure to facilitate a manual operation thereof.

---

Background of the invention

In the present industry air driven motors are frequently employed as tools. For example, pneumatically operated tools such as jack hammers, riveting guns and air drills are employed by almost every industry dealing in the manufacture of metallic structures. All air driven motors include a compressed air supply and a motor assembly which is operated by the compressed air. It is desirable to regulate the flow of air to the motor with some form of a regulating valve being employed. Such a valve can in one position cause the compressed air to enter the motor and in another position prevent the air from entering the motor. This on-off position is regulated by the operator of the motor.

Heretofore, the design of such valves has not been with the operator in mind. In other words, most valves are normally biased by the pressure of the air supply itself to the closed position (not admitting air flow to the motor). This means that the operator must, when he desires to operate the motor, manually compress the valve and hold the valve in that position for the period of time that it is desired that the motor be operated. In some instances this may be a substantial length of time. It is common in the industry that operators have overcome this difficulty by merely binding the valve in the open position as by adhesive tape or the like. Then, when it is desired to shut off the motor, it is necessary to remove the tape therefore requiring a cumbersome and time-consuming procedure.

In some instances an attempt has been made to provide a valve which can be held in the open position. However, the locking arrangement which accomplishes such, requires the use of both hands of the operator. It would be most desirable to lock the valve in either the open or closed position with only one hand and likewise to unlock the valve.

Summary

Specifically, the valve assembly of this invention comprises a sleeve which is adapted to be fixedly secured within a pneumatic motor assembly. The sleeve contains a ratcheting pawl pivotally mounted and normally biased to a locked position. The sleeve also contains a set screw so that a particular angular relationship of the sleeve with respect to the motor assembly can be established. Within the sleeve is mounted a valve spool which can be moved longitudinally therein between an open position and a closed position. The open position permits access of the compressed air into the air motor. The closed position does not permit access of the air to the air motor. The ratcheting pawl moves within a slot in the sleeve and can cooperate with spaced grooves of the spool. With the ratcheting pawl cooperating with a first groove of the spool, the spool is maintained in the open position. With the ratcheting pawl in a second groove in the spool, the spool is held in the closed position. The spool is so located with respect to the air motor assembly that it is to be easily operated by the operator with one hand. Also, the ratcheting pawl is so located with respect to the spool that both the ratcheting pawl and the spool can be operated with one hand. To accomplish this the ratcheting pawl includes a bulbous portion to facilitate sightless location and operation of the ratcheting pawl.

An object of the apparatus of this invention is to provide a simple and positive valving arrangement to regulate the access of air to an air driven motor.

A second object of this invention is to provide a locking arrangement to hold the valve in both the open and closed positions.

A further object of this invention is to provide a locking means which can be easily operated with only one hand, that hand also being the one to operate the valve itself.

Brief description of the drawing

FIG. 1 shows a cutaway, partly in section side view showing the valve of this invention for regulating the flow of air through a handle portion of an air motor assembly;

FIG. 2 is a sectional side view showing the valve of this invention in the closed position;

FIG. 3 is a view similar to FIG. 2, showing the valve of this invention in the open position; and FIG. 4 is a view taken along line 4—4 of FIG. 1 showing the ratcheting pawl of this invention which effects locking of the valve of this invention in both the open and closed positions.

Description of the invention

Referring particularly to FIG. 1 of the drawing, there there is shown a handle 10 of an air motor assembly 12. Within the handle 10 is provided an air inlet passage 14 which ducts the air to operate the air motor (not shown). Provided within the passage 14 in such a manner as to open or close passage 14, is the valve assembly 16 of applicant's invention. The valve assembly 16 comprises two main parts, a sleeve 18 and a spool 20. Sleeve 18 includes an enlarged head 22, a threaded element 24, an aperture section 26 and a sealing rib 28. Sleeve 18 is fixedly secured to the handle 10 by means of the threaded element 24 which matingly cooperates with a corresponding opening located in the handle 10. With the sleeve 18 so installed the aperture portion 26 cooperates with air inlet passage 14 and is capable of passing air from within the sleeve 18 into air inlet passage 14 thereby into the air motor. The sealing rib section 28 is formed of two annular ribs 30 and 32 which have interposed therebetween a sealing O-ring 34. Annular ribs 30 and 32 are to matingly cooperate in a substantial airtight manner with the air inlet passage 14. The O-ring 34 insures that the connection therebetween is airtight.

Spool 20 includes a sealing rib 36 which has mounted adjacent thereto a sealing O-ring 38. The connection established by the O-ring 38 between the sealing rib 36 and the annular rib 32 is also airtight. A second rib 40 is provided to be substantially in flush contact with the interior of sleeve 18 which is to provide alignment of the spool 20 with respect to the sleeve 18 during relative movement thereof. Spool 20 also includes a narrow rod section 42, a third sealing rib 44, a fourth sealing rib 46 and a fifth sealing rib 48. Fixedly secured adjacent to the fifth sealing rib 48 is knob 50. Located between the third sealing rib 44 and the fourth sealing rib 46 is a first groove 52, and located between the fourth sealing rib 46 and the fifth sealing rib 48 is a second groove 54. The function of the first and second grooves will be explained further in this specification.

Pivotally mounted by pivot pin 58 upon head 22 is a ratcheting pawl 56. Pivot pin 58 is mounted upon head 22 in substantial axial alignment with the sleeve 18 so that the pivoting action of pawl 56 is transverse with respect to the movement of the spool 20. Ratcheting pawl 56 is biased by a spring 60 with respect to head 22 to a locked position. Ratcheting pawl 56 is to cooperate with first and second grooves 52 and 54, the spring 60 normally biasing the pawl into such cooperation. Ratcheting pawl 56 includes a bulbous portion 62 at one extremity thereof, the function of which will be explained hereinafter. Head 22 contains a set screw 64 the purpose of which is to align ratcheting pawl 56 in a certain direction with respect to handle 10. Once the position between handle 10 and the head 22 of the sleeve 18 has been established, the set screw 64 is then tightened to fix the position relationship therebetween.

The operation of the valve of this invention is as follows: With the valve in the position as shown in FIGS. 1 and 2 of the drawing, the air supply passes through passage 14 to the air motor. In this position ratcheting pawl 56 is cooperating with groove 52, thereby holding the valve in this position and preventing accidental operation of the air motor. When it is desired to effect operation of the motor, the operator first pivots ratcheting pawl 56 against spring 60, bulbous portion 62 being provided to facilitate such movement, and then the operator through knob 50 causes longitudinal movement of spool 20 to the position shown in FIG. 3 of the drawing. In this position pressurized air (from a source not shown) is transmitted about sealing rib 36 and second rib 40 of the spool 20 into the interior of the sleeve 18 and thereupon passed into passage 14 through the aperture section 26. Ratcheting pawl 56 is now permitted to enter groove 54 thereby maintaining this open position of spool 20. The pressurized air is then permitted to cause operation of the air motor.

When it is desired to move the spool 20 from the open position to the closed position, the above procedure is repeated, except for movement of the spool 20 in the opposite direction.

The particular form of the present invention shown in the drawing and described herein has been found to be most satisfactory. However, the various elements of the combination and forms, construction and arrangements thereof are capable of numerous changes and modifications. In view thereof it should be understood that the form of the invention shown in the drawing and herein described are intended to be illustrative only and are not intended to limit the scope of the invention.

I claim:

1. A valve assembly for regulating fluid flow comprising:
    a housing, said housing having a fluid passage therein;
    a sleeve being fixedly secured to said housing and extending into said fluid passage, the connection between said sleeve and said passage being substantially fluid-tight;
    a spool being movably supported between a first and second position within said sleeve, said spool being capable of permitting flow of fluid when in said first position and preventing flow of fluid when in said second position through said passage;
    a locking means being connected to and entirely supported by said sleeve, said locking means being capable of maintaining said spool in both said first and second positions.

2. An apparatus as defined in claim 1 wherein:
    said spool includes first and second spaced grooves, said locking means cooperates with said first groove when said spool is in said first position, said locking means cooperates with said second groove when said spool is in said second position.

3. An apparatus as defined in claim 2 wherein:
    said locking means comprises a pivotal pawl, said pawl being normally biased toward the cooperating position with said grooves.

4. An apparatus as defined in claim 3 wherein:
    said pawl includes a bulbous portion to facilitate manual movement thereof.

5. An apparatus as defined in claim 4 wherein:
    said sleeve containing a set screw to firmly position the angular location of said sleeve with respect to said housing, whereby the location of said bulbous portion of said pawl may be of best advantage to facilitate manual movement of said pawl.

References Cited

UNITED STATES PATENTS 1,068,605   7/1913   Robertson _____ 251—116

FOREIGN PATENTS 257,406   9/1926   Great Britain.
611,840   1/1961   Canada.
288,641   3/1953   Switzerland.

HENRY T. KLINKSIEK, Primary Examiner

U.S. Cl. X.R.

173—169